United States Patent
Thomas et al.

(10) Patent No.: US 10,496,821 B2
(45) Date of Patent: Dec. 3, 2019

(54) PARALLEL PROCESSING FOR MALWARE DETECTION

(71) Applicant: Malwarebytes Inc., Santa Clara, CA (US)

(72) Inventors: Sunil Mathew Thomas, Palm Harbor, FL (US); Michael Graham Malone, Largo, FL (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 16/215,256

(22) Filed: Dec. 10, 2018

(65) Prior Publication Data

US 2019/0294793 A1   Sep. 26, 2019

Related U.S. Application Data

(63) Continuation of application No. 15/927,033, filed on Mar. 20, 2018, now Pat. No. 10,185,826.

(51) Int. Cl.
  *G06F 21/56* (2013.01)
  *G06F 21/53* (2013.01)
  *G06F 21/55* (2013.01)
  *G06F 9/38* (2018.01)

(52) U.S. Cl.
  CPC .......... *G06F 21/566* (2013.01); *G06F 9/3836* (2013.01); *G06F 21/53* (2013.01); *G06F 21/552* (2013.01)

(58) Field of Classification Search
  CPC ..................................................... G06F 21/566
  USPC ............................................................ 726/24
  See application file for complete search history.

(56) References Cited

U.S. PATENT DOCUMENTS

2014/0298470 A1   10/2014   Yablokov et al.
2015/0096021 A1   4/2015   Uscilowski et al.

OTHER PUBLICATIONS

United States Office Action, U.S. Appl. No. 15/927,033, dated Jun. 5, 2018, nine pages.

*Primary Examiner* — Jacob Lipman
(74) *Attorney, Agent, or Firm* — Fenwick & West LLP

(57) ABSTRACT

Client devices detect malware based on a ruleset received from a security server. To evaluate a current ruleset, an administrative client device initiates a ruleset evaluation of the malware detection ruleset. A security server partitions stored malware samples into a group of evaluation lists based on an evaluation policy. The security server then creates scanning nodes on an evaluation server according to the evaluation policy. The scanning nodes scan the malware samples of the evaluation lists using the rulesets and associate each malware sample with a rule of the ruleset based on the detections, if any. The security server analyzes the associations and optimizes the ruleset and stored malware samples. The security server sends the optimized ruleset to client devices such that they more efficiently detect malware samples.

20 Claims, 4 Drawing Sheets

PARALLEL PROCESSING FOR MALWARE DETECTION

FIELD OF ART

This application is a continuation of U.S. application Ser. No. 15/927,033, filed Mar. 20, 2018, now U.S. Pat. No. 10,185,826.

BACKGROUND

Field of the Invention

The present disclosure generally relates to evaluating malware detection rulesets, and more specifically to parallel processing to evaluate rulesets.

Potentially malicious applications and files (also known as "malware") on a client device are often evaluated against a ruleset to define which applications and files are malicious. Over time, the rulesets used to evaluate the potential malware grows and, hence, evaluating each rule takes an increasing amount of computational resources on the client devices. In addition, the number of potentially malicious applications and files that are evaluated by the ruleset increases causing total evaluation times to increase. Traditionally, optimizing the ruleset such that it minimizes computational costs on a client device is a complex and prolonged procedure. Further, minimizing the malware collection process such that it increases time efficiency is a complex problem that can reduce detection and verification quality.

SUMMARY OF THE INVENTION

A technique is disclosed for optimizing the rules of a ruleset using a parallel evaluation process in a networked computer environment. A request to evaluate a malware detection ruleset is received at a security server. The request can additionally include an evaluation policy which describes methodologies for evaluating the ruleset. In some configurations, the malware samples in the set of malware samples are received from client devices executing a security application detecting malware samples based on a ruleset. In other configurations, the set of malware samples is stored in a sample datastore of the security server.

The security server divides a set of malware samples into a set of evaluation lists based on the evaluation policy. Each evaluation list includes at least one malware sample and the evaluation lists, in aggregate, include all of the malware samples of the set of malware samples.

Subsequently, the security server installs an array of scanning nodes on distinct partitions of an evaluation server based on the evaluation policy. In some configurations, installing the array of scanning nodes includes sending an installation request to the evaluation server. The installation request can include the number of partitions to be created by the evaluation server and an executable image of the scanning node to be installed in the partition. In another configuration, the evaluation server sends a request to update the scanning nodes to a current version to the security server and the security server responds with an update for the scanning nodes.

The number of installed scanning nodes is based on the received evaluation policy. In some cases, the security server determines a number of scanning nodes to install such that each of the installed scanning nodes takes approximately the same amount of time to evaluate one evaluation list. In this case, the evaluation server can determine the minimum number of scanning nodes capable of evaluating the evaluation lists within an evaluation time period included in the evaluation policy. In various configurations, the evaluation policy can additionally include the amount of time required to evaluate a ruleset, the size of evaluation lists, the number of evaluation lists, etc.

The security server provides evaluation lists to the array of scanning nodes on the evaluation server. The security server controls the array of scanning nodes on the evaluation server and evaluates the evaluation lists. Each respective scanning node evaluates the malware samples included in its respective evaluation list by applying each rule of the malware detection ruleset to each malware sample of the evaluation list. The scanning nodes scan the set of evaluation lists and, accordingly, evaluate every malware sample of the set of malware samples against every rule of the ruleset. In some cases, the scanning nodes evaluate evaluation lists in series. That is, the scanning node will evaluate a first evaluation list and, after evaluating the first evaluation list, receive a second evaluation list for evaluation.

After evaluation, the security server receives the results of the evaluation from the evaluation server and stores the results in an evaluation database of the network system. In some cases, the network system optimizes the rules of the ruleset based on the stored evaluation result. Optimizing the ruleset can include determining that rules of the ruleset are redundant, determining that rules of the ruleset do not detect malware samples, determining rules that detect malware more efficiently than other rules (e.g., less processor resources required, memory required, processor time required, etc.), or determining the malware samples that are undetected by rules of the ruleset. In some configurations, the security server can send the optimized ruleset to client devices executing a security application.

BRIEF DESCRIPTION OF THE DRAWINGS

The invention has other advantages and features which will be more readily apparent from the following detailed description of the invention and the appended claims, when taken in conjunction with the accompanying drawings, in which:

Figure 1:
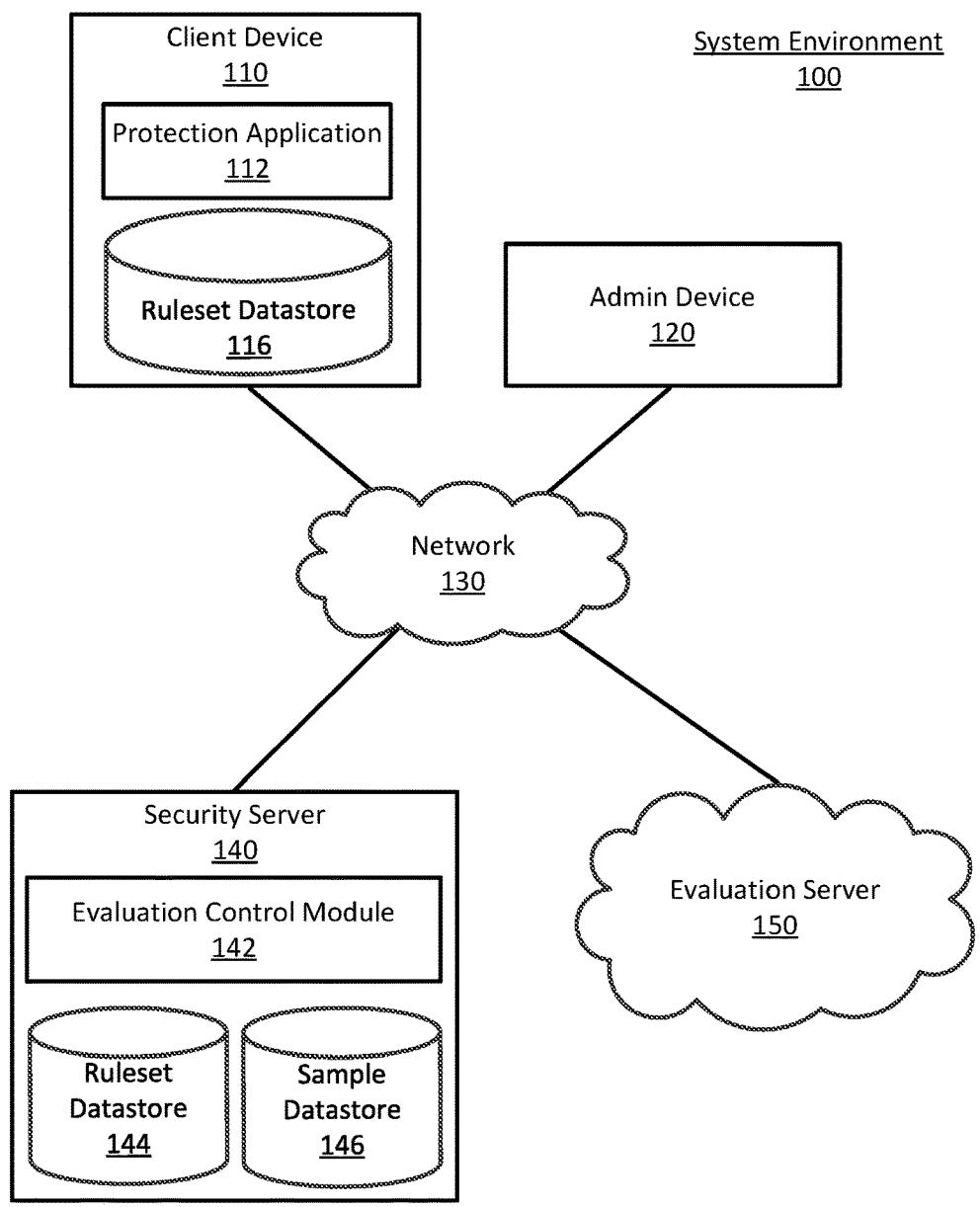
FIG. 1 is a system diagram illustrating an example embodiment of a networked computing environment, according to one example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In a modern computing environment, the number and type of malicious applications and files (i.e., "malware") that reach client devices is vast. As such, methods for detecting malware are increasingly complex and computationally expensive. In one approach, a set of rules (i.e., a ruleset) is defined that detects malware that is installed, executed, or stored on client devices. Generally, each rule can be defined by an administrator of a network security system or may be automatically generated. A rule may comprise, for example, a static fingerprint-based rule that applies a hash or algorithm to a file, process, or portion thereof and compares the resulting digital fingerprint against reference digital fingerprints of known malware. Alternatively, a rule may comprise a behavior-based rule that tracks the behavior of a file or process as it executes and compares the behavior sequence against the behavior of known malware. As new malware becomes known that cannot be detected by the existing ruleset, a new rule designed to detect the new malware may be created and added to the ruleset. As an example, a computer hacker releases malware that installs a rootkit on cellular phones to compromise the cellular phones data. In response, a rule creation tool (which may be automated or manually-assisted) analyzes the malware and creates a rule that will detect it on the cellular phone.

As the number of different types of malware grows, so too does the ruleset. Over time, the ruleset increases in size and performing scans by applying each rule in the ruleset becomes computationally expensive. To avoid the ruleset growing indefinitely, some rules of the ruleset may be deemed obsolete and removed from the ruleset when it is detected that the rule is no longer applicable to currently prevalent malware. Additionally, as the active malware and ruleset evolve, certain rules of the ruleset may become redundant. Here, a rule is deemed redundant if the rule only detects malware that can already be detected by other rules in the ruleset. Furthermore, it may be determined that certain rules of redundant rulesets may be preferred due to efficiencies over other redundant rules which detect the same malware. In order to maintain a ruleset that can efficiently detect active malware, it is beneficial to periodically conduct a ruleset evaluation that determines which rules in the ruleset detect which malware. The technique described herein evaluates and optimizes a ruleset for detecting malware samples using parallel processing techniques.

I. System Architecture

FIG. 1 is a high-level block diagram illustrating a system environment 100 for evaluating and optimizing a ruleset for detecting malware. The system environment 100 comprises a client device 110, an admin device 120, a network 130, a security server 140 and an evaluation server 150. For simplicity and clarity, only one client device 110, admin device 120, security server 140, and evaluation server 150 are shown; however, other embodiments may include different numbers of clients and servers. Furthermore, the system environment 100 may include different or additional entities.

Each client device 110 comprises one or more computing devices capable of processing data as well as transmitting and receiving data via a network 130. For example, a client device 110 may be a desktop computer, a laptop computer, a mobile phone, a tablet computing device, an Internet of Things (IoT) device, or any other device having computing and data communication capabilities. Each client device 110 includes a processor for manipulating and processing data, and a storage medium for storing data and program instructions associated with various applications executing on the client device 110. The storage medium may include both volatile memory (e.g., random access memory) and non-volatile storage memory such as hard disks, flash memory, and external memory storage devices. In addition to storing program instructions, the storage medium stores files as well as various data associated with the operation of applications on the client device 110.

The client device 110 may include various applications for performing a particular set of functions, tasks, or activities for the user. Example applications may include a word processor, a spreadsheet application, a web browser, etc. In some cases, applications can be a source of malware. The malware may be executed (or installed) on the client device 110 when the applications on the client device 110 are executed (or installed), or when a file associated with the application is accessed.

In one embodiment, the client device 110 includes a protection application 112 which detects malware installed or otherwise stored or executing on the client device 110. To determine whether the client device 110 is infected with malware, the protection application 112 analyzes software components on the client device 110 according to a malware detection policy. Broadly, the malware detection policy defines how the client devices 110 detect malware. The malware detection policy specifies the ruleset or subset thereof that the protection application 112 applies to detect malware on the client device 110. Additionally, the malware detection policy can indicate to which software components the protection application 112 should apply the ruleset (e.g., regions of a hard-drive or specific applications). The malware detection policy may furthermore specify a security level indicative of a scan type (e.g., detailed scan, cursory scan, etc.).

After applying the malware detection policy, the protection application 112 sends the detected malware or identifying information for the detected malware to the security server 140. In some embodiments, the protection application 112 can act to remediate the malware (e.g., through removal, quarantine, etc.).

The system environment 100 can be monitored and maintained by one or more system administrators operating an admin device 120. The system administrators are responsible for facilitating the detection of malware on the client devices 110 by creating and maintaining a robust malware detection ruleset. The admin device 120 is a client device (e.g., a system administrator network computer) with administrative permissions capable of performing various administrative tasks (e.g., initiating a ruleset evaluation) that can be used to optimize the ruleset applied by the client devices 110. Initiating a ruleset evaluation sends an evaluation request to the security server 140. In some embodiments, the evaluation request includes an evaluation policy defined on the admin device 120 (e.g., by the administrator operating the admin device 120) that controls a ruleset evaluation as described below. In some configurations, the admin device 120 receives the results of the ruleset evaluation using the evaluation policy and optimizes the ruleset based on an analysis of the result. Optimizing the ruleset can include modifying, deleting, or adding rules of the ruleset as will be described in further detail below.

Within the system environment 100, the network 130 represents the communication pathways between the client device 110, the admin device 120, the security server 140, and the evaluation server 150. In one embodiment, the network 130 includes a wide area network (e.g., the Internet). The network 130 can also include one or more enterprise local area networks that utilize dedicated or private communications links that are not necessarily part of the Internet.

The evaluation server 150 is a data server or distributed computing system that may include a network of physical and/or virtual computing systems. The evaluation server 150 includes a plurality of scanning nodes that may each receive information from the security server 140 to facilitate a ruleset evaluation.

Broadly, the scanning nodes on the evaluation server 150 evaluate malware samples according to a malware detection policy similarly to the protection application 112. That is, the scanning nodes determine if a rule of the ruleset, if any, detects a malware sample. Dissimilarly from the protection application 112, the evaluation server 150 can evaluate the malware samples in parallel using a large number of scanning nodes. Each scanning node can evaluate any combination of malware samples and rules of the ruleset. Generally, increasing the number of scanning nodes increases the amount of parallelization in a ruleset evaluation and decreases the amount of time required to evaluate the ruleset. Ruleset evaluation by the evaluation server 150 is described in more detail below with respect to FIG. 3.

The evaluation server 150 may reside in a cloud environment. The cloud environment in which the evaluation server 150 executes may be maintained by a third-party cloud computing provider that provides shared computer processing and data storage resources in an on-demand fashion. In this cloud environment, the evaluation server 150 is not necessarily implemented on a single physical server and does not necessarily comprise only a single physical storage device. Instead, the evaluation server 150 may be implemented as one or more physical servers, one or more virtual servers, or a combination of physical and virtual servers.

In this environment, the scanning nodes may be created using the shared cloud computing resources on an on-demand basis. For example, a scanning node is created by loading an image of a scanning application on a physical or virtual server hosted in the cloud environment. After performing a scan, the scanning application may be removed from the physical or virtual server, thus enabling the computing resources to become available again in the shared resource pool, where they may be utilized for a different purpose.

Evaluating malware samples against rules of a ruleset using an evaluation server 150 that operates in a cloud environment has several advantages over a conventional security architecture in which a local security server operates on a local area network. Implementing the evaluation server 150 in the cloud environment simplifies scalability and elasticity of allocable resources for evaluating a ruleset. For example, instead of an enterprise having to acquire and configure more physical servers to evaluate a ruleset more rapidly, the security server 140 may simply obtain control of additional available computing resources in the cloud environment to scale the evaluation server 150. Using existing third-party cloud computing services, this type of scaling can be achieved in a seamless and substantially automated manner without significant burden on the administrator. Additionally, because such scans may require a significant amount of computing resources, but may be performed on an irregular basis, the use of cloud resources to perform such scans on a per-scan basis may be more efficient than operating a large number of local servers that may be underutilized between scans.

The security server 140 is a computer system configured to store, receive, and transmit data to client devices 110, admin devices 120, the evaluation server 150, or to other servers via the network 130. The security server 140 may include a singular computing system, such as a single computer, or a network of computing systems, such as a data center or a distributed computing system. In an embodiment, the security server 140 may operate on the same local area network as the admin device 120. Alternatively, the security server 140 may operate in a cloud environment remote from the admin device 120. Here, the security server 140 may be implemented as one or more physical servers or one or more virtual servers configured to perform the functions of the security server described herein.

The security server 140 includes a processor for manipulating and processing data and a storage medium for storing data and program instructions associated with various modules. In particular, the storage medium includes an evaluation control module 142, a ruleset datastore 144, and a sample datastore 146. Alternative embodiments may include different or additional modules or omit one or more of the illustrated modules.

The security server 140 may receive evaluation requests from the admin device 120 to evaluate a malware detection ruleset and respond by transmitting the results of a ruleset evaluation to the admin device 120. Additionally, the security server 140 may transmit rulesets to client devices 110 and receive detected malware from client devices 110 or from other sources (e.g., samples found during independent analysis, samples received via email or an email or website, etc.). The security server 140 includes a sample datastore 146 for storing the malware samples to be analyzed by the evaluation server 150 and a ruleset datastore 144 that stores a ruleset.

The evaluation control module 142 controls ruleset evaluations performed on the evaluation server 150 that determines which rules of the stored ruleset detects each of the stored malware samples. Controlling evaluation of a ruleset via the evaluation control module 142 is described in more detail below with respect to FIG. 2.

The evaluation control module 142 initiates a ruleset evaluation on the evaluation server 150 when an evaluation request is received from an admin device 120. In other embodiments, the evaluation control module 142 automatically initiates a ruleset evaluation after a given period of time or at regular time intervals (e.g., nightly, weekly, etc.). The control parameters for the ruleset evaluation may be based on the evaluation policy received with the evaluation request or otherwise stored by the security server 140. Based on the evaluation control policy, the evaluation control module 142 divides the samples in the sample datastore 146 into sets of samples (i.e., evaluation lists) and distributes each set to a different scanning node.

Generally, the evaluation policy defines how the evaluation control module 142 evaluates a ruleset. Further, the evaluation policy defines the level of parallelization for evaluating a ruleset using the evaluation server 150. That is, the evaluation policy can include parameters that define the number of created evaluation lists, the number of created scanning nodes, how evaluation lists are sent to the scanning nodes, malware detection policies for the scanning nodes, how to optimize evaluated rulesets, or any other information associated with evaluating a ruleset on the security server 140.

In one embodiment, the evaluation policy defines the number of evaluation lists to create. Here, the evaluation control module 142 may automatically distribute the malware samples between the evaluation lists in a manner that minimizes the total evaluation time when the evaluation lists are processed by the evaluation server 150. In another embodiment, the evaluation policy defines the number of malware samples in each evaluation list. In this case, the evaluation control module 142 determines the number of evaluation lists and how to distribute the samples to the evaluation lists to minimize the total evaluation time when the evaluation lists are processed by the evaluation server 150. Alternatively, the evaluation policy may define both the number of evaluation lists and the number of samples in each list.

In another configuration, the evaluation policy may define a maximum amount of time for a ruleset evaluation to be completed (e.g., three minutes, two hours, one day, etc.). In this case, the evaluation control module 142 analyzes the malware samples stored in the sample datastore 146 and determines the number of evaluation lists and a corresponding number of scanning nodes to create such that the ruleset evaluation can be completed in less than the specified maximum amount of time when each scanning node scans one of the evaluation lists. Particularly, in one embodiment, the number of evaluation lists may be selected that minimizes the number of evaluation lists (and a corresponding number of scanning nodes) while still enabling all of the samples to be scanned in a specified time period. The evaluation control module 142 can partition the malware samples such that each evaluation list can be evaluated in a similar amount of time by respective scanning nodes during a ruleset evaluation in accordance with the evaluation policy.

In order to determine how to distribute the samples between the evaluation lists based on any of the criteria described, the evaluation control module 142 may obtain predictions for how long it will take to scan each malware sample. In an embodiment, the evaluation control module 142 assigns a predefined constant time for scanning each sample that may be based on an observed average scan time. In another embodiment, the evaluation control module 142 may categorize malware samples by type, and assign different predefined times based on the type (e.g., a predefined time for an encrypted binary program, a predefined time for an unencrypted non-binary program, etc.). In other embodiments, times may be predicted for each individual malware sample. In another embodiment, the predefined time may be based on certain tokens in malware samples at specific locations and, in some cases, may be agnostic to sample type. In some cases, the malware samples stored in the sample datastore 146 are highly dissimilar (e.g., having different sizes or different complexities). As such, each malware sample may have a dissimilar evaluation time during a ruleset evaluation. For example, larger or more complex malware samples may require a longer amount of time to scan than smaller or simpler malware samples (e.g., a binary file is assigned a greater predefined time than a document file). In other cases, the evaluation time is unrelated to the size or complexity of the stored samples. In some embodiments, a predefined evaluation time may be stored as metadata in association with each malware sample. The predefined evaluation time may be obtained outside of the ruleset evaluation process by applying each rule to the malware sample and measuring the evaluation time. In other similar embodiments, the predefined evaluation time for a malware sample is the amount of time it took for the malware sample to be evaluated the previous time it was evaluated.

In an embodiment, the evaluation policy defines a malware detection policy for the scanning nodes. Generally, the malware detection policy is equivalent to the malware detection policy of the protection application 112 but can be any other malware detection policy. In some cases, each scanning node has a distinct malware detection policy.

In an embodiment, the number of evaluation lists for evaluation may be greater than the number of installed scanning nodes. In this case, a subset of evaluation lists are initially distributed to the scanning nodes for scanning. When a scanning node completes the evaluation of an evaluation list, the scanning node can send a request for an additional evaluation list to the evaluation control module 142. Accordingly, the evaluation control module 142 responds by transmitting an additional evaluation list to the scanning module for evaluation. The evaluation control module 142 continues to transmit evaluation lists to requesting scanning nodes until there are no evaluation lists remaining for evaluation. In addition, when the number of evaluation lists for evaluation exceeds the number of installed scanning nodes, the evaluation control module 142 may deploy additional scanning nodes to such that the evaluation control module 142 can complete an evaluation within the specified policy.

The evaluation control module 142 receives results of the evaluation from the scanning nodes after they perform the scans on their respective evaluation lists. The results indicate, for each rule in the ruleset, which samples the rule detects (if any) and identifies any samples that are not detected by any rule. After the ruleset evaluation, the evaluation control module 142 optimizes the stored ruleset based on the detections of malware samples by the rules of the ruleset and stores the optimized ruleset to the ruleset datastore 144. The evaluation control module 142 may also transmit the optimized ruleset to the client device 110. In some cases, only the changes to the previous ruleset are transmitted to the client device 110 and the client device updates the previously stored ruleset. In an alternative embodiment, the admin device 120 optimizes the stored ruleset instead of the security server 140. In this case, the evaluation control module 142 transmits the detection information and stored ruleset to the admin device 120 as an evaluation result and receives an optimized ruleset in return.

II. Ruleset Evaluation

Figure 2:
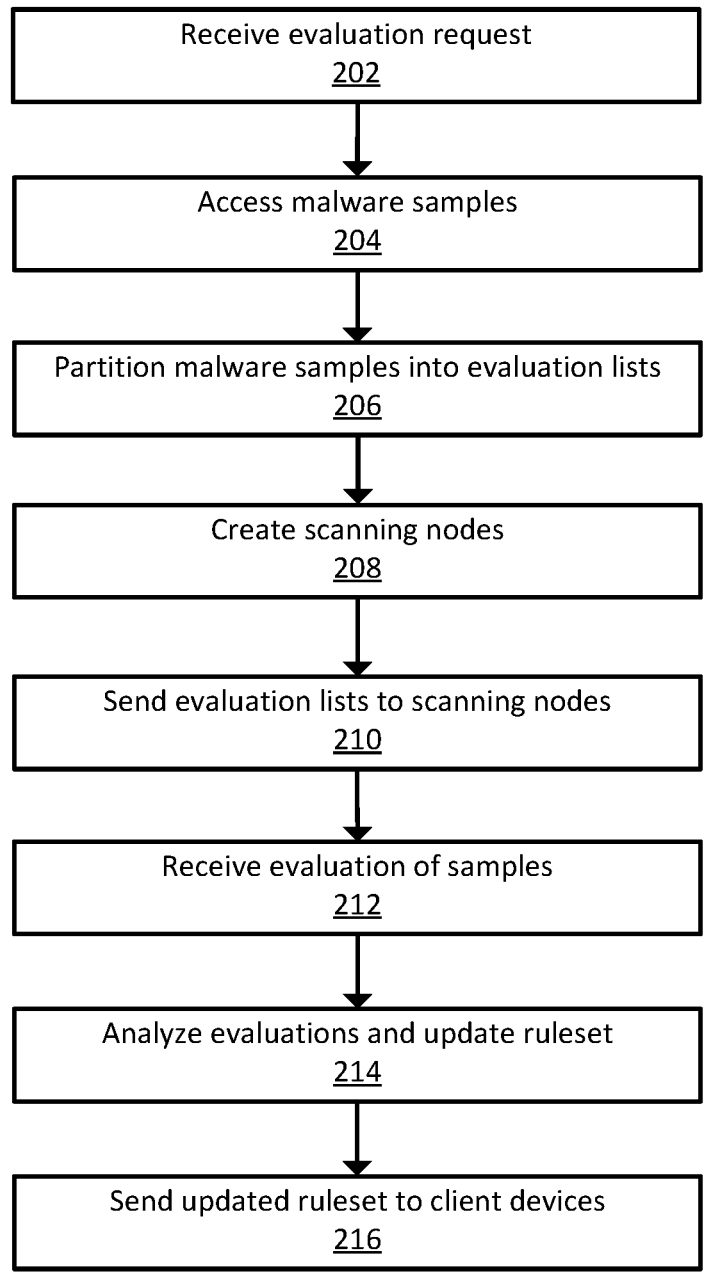
FIG. 2 is a flowchart illustrating a process for controlling the evaluation of a ruleset, according to one example embodiment.

FIG. 2 is a flowchart illustrating an embodiment of a process for controlling evaluation of a ruleset using the evaluation control module 142 of the security server 140. The evaluation control module 142 receives 202 an evaluation request (e.g., from the admin device 120 via the network 130). The evaluation request includes an evaluation policy that directly or indirectly controls the parallelization level for evaluating the ruleset. For example, in an embodiment, the evaluation policy defines a maximum desired amount of time that the ruleset evaluation will take.

The evaluation control module 142 accesses 204 malware samples stored in the sample datastore 146.

The evaluation control module 142 partitions 206 the malware samples into a set of evaluation lists based on the evaluation policy and the number of samples. In an embodiment, every malware sample stored in the sample datastore 146 is included in one and only one evaluation list. Alternatively, the evaluation policy defines that not all malware samples of the list will be included in the set of evaluation lists.

In an embodiment, the evaluation control module 142 partitions 206 the malware samples in a way that utilizes the fewest number of scanning nodes while still enabling the evaluation server 150 to complete the evaluation within a time period specified by the evaluation policy. For example, the evaluation control module 142 may predict an estimated time to evaluate each sample and then determine a total processing time to evaluate the complete sample set. The evaluation control module 142 then divides the total processing time by the desired completion time to determine an initial estimate for the number of evaluation lists and corresponding scanning nodes to create. The evaluation control module 142 then generates the evaluation lists such that each scanning node will take approximately the same amount of time to scan its respective set of samples. In some cases, the initial estimate for the number of evaluation lists may increase by a small number once the samples are initially partitioned into the evaluation lists if necessary to ensure that the desired completion time can be met.

The evaluation control module 142 creates 208 a number of scanning nodes on the evaluation server 150 based on the evaluation policy. In one embodiment, the evaluation control module 142 creates scanning nodes by sending an image of the protection application 112 or portion thereof to be installed on each of the scanning nodes of the evaluation server 150. In another embodiment, the evaluation control module 142 sends installation instructions to the evaluation server 150 and the evaluation server 150 obtains and installs the image.

Subsequently, the evaluation control module 142 sends 210 evaluation lists to the created scanning nodes. In some cases, the evaluation control module 142 automatically sends evaluation lists to the scanning nodes after the malware samples are partitioned. In other cases, the evaluation control module 142 can send an evaluation list to a scanning node when the scanning node requests an evaluation list.

Each scanning node evaluates each rule of the ruleset against the malware samples in the received evaluation list according to a malware detection policy. After evaluating the evaluation list, the security server receives 212 an assessment of the evaluation of each evaluation list from the scanning nodes. The assessment of the evaluation list includes associations indicating which rule (or rules) of the ruleset detects each malware sample of the evaluation list, if any. The evaluation control module 142 aggregates the assessments received from the scanning nodes into an aggregate ruleset assessment. Hence, the aggregate ruleset assessment includes all associations between any rule of the ruleset and any malware sample detected by the rules.

The evaluation control module 142 analyzes 214 the aggregate ruleset assessment and optimizes the ruleset datastore 144 based on the analysis. In another embodiment, the admin device 120 optimizes the ruleset instead of evaluation control module 142.

As one example of optimization, the evaluation control module 142 determines that a malware sample is not detected by any rule of the ruleset. In this case, the evaluation control module 142 can optimize the ruleset by generating a rule for the ruleset that detects the unassociated malware sample. Alternatively, the security server 140 can send the undetected malware sample to the admin device 120 which can then generate a rule that detects the previously undetected malware sample. In another case, the security server 140 can set a flag in the sample datastore 146 indicating that the malware sample is undetected by the ruleset. In another example, the evaluation control module 142 determines that a rule of the ruleset does not uniquely detect any malware sample (i.e., the rule is redundant). That is, one rule of the ruleset only detects malware samples already detected by other rules of the ruleset. In this case, the evaluation control module 142 optimizes the ruleset by removing the redundant rule from the ruleset datastore 144. In another instance, the evaluation control module 142 determines a relative efficiency of redundant rules of the ruleset. That is, when multiple rules detect a similar malware sample, evaluation control module 142 can remove the less efficient rules (i.e., the rules that require more computational cycles, system memory, processing time, etc.). In another example, the evaluation control module 142 determines that a rule does not detect any malware samples. In this case, the evaluation control module 142 optimizes the ruleset by removing the rule from the ruleset datastore 144. Optimizing the ruleset can include any of the preceding examples in any number or combination. Further, the ruleset evaluation may include other optimizations not explicitly described.

The evaluation control module 142 stores the updated ruleset in the ruleset datastore 144. In one embodiment, the security server 140 sends 216 the updated ruleset to the client devices 110 so that each client device 110 includes the most efficient and up-to-date ruleset. In some cases, evaluation control module 142 consolidates several rulesets into a single ruleset. For example, in a case where the evaluation control module 142 evaluates several ruleset (or several parts of a ruleset) evaluation control module consolidates the rulesets to avoid redundancies. Generally, consolidated results are more efficient that un-consolidated results.

Figure 3:
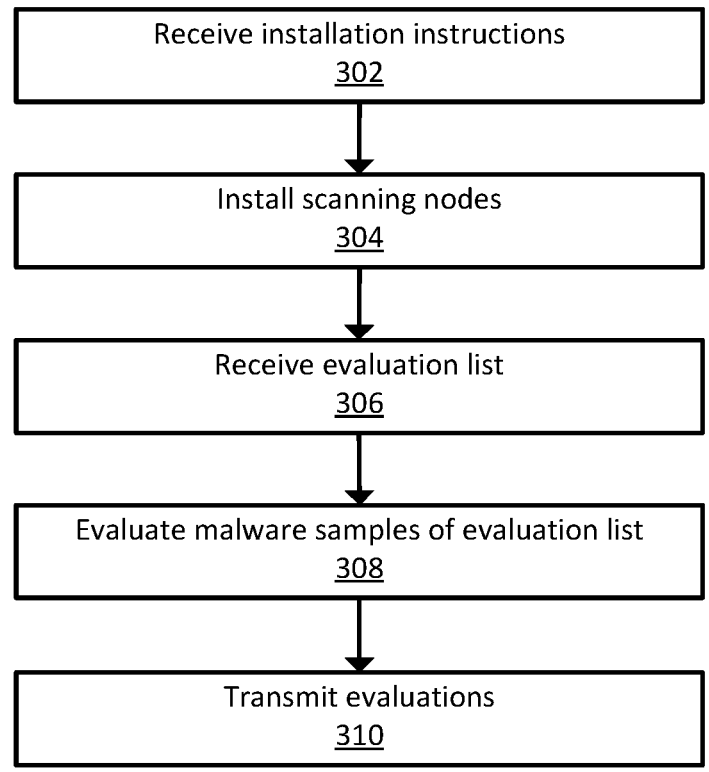
FIG. 3 is a flowchart illustrating a process for evaluating malware samples on an evaluation server, according to one example embodiment.

FIG. 3 is a flowchart illustrating an embodiment of a process for determining the association between rules of a ruleset and a malware sample using the evaluation server 150. The evaluation server 150 receives 302 installation instructions for a set of scanning nodes from the security server 140. The installation instructions can include an image of the protection application 112 or portion thereof for installation in each scanning node on the evaluation server 150. Further, the installation instructions can include the number of scanning nodes to create, the malware detection policy for the scanning node, or any other information to facilitate evaluating a ruleset.

The evaluation server 150 installs 304 the scanning nodes. In one embodiment, installing the scanning nodes includes installing the protection application 112 on each scanning node of the evaluation server 150 from the received image of the protection application 112. In some embodiments, installing the scanning nodes can include updating the protection application 112 to the most current state by communicating with the security server 140. That is, the scanning nodes can send an update request to the security server 140 and receive an update in return. Updating the scanning nodes can include receiving the most current ruleset for detecting malicious samples from the security server 140, adding functionality to installed scanning nodes, or increasing the efficiency of the scanning nodes.

Once installed, each scanning node receives 306 an evaluation list from the security server 140. The evaluation lists include a set of malware samples to evaluate according to a malware detection policy. Accordingly, the scanning node evaluates 308 the malware samples of the evaluation list according to the malware detection policy (similarly to protection application 112). The scanning node determines which malware samples of the evaluation list are detected and for each detected sample, stores an association between the sample and the rule of the ruleset that detected it. This list of associated samples and rules is aggregated into an assessment and the assessment is transmitted 310 to the security server 140.

III. Computer

Figure 4:
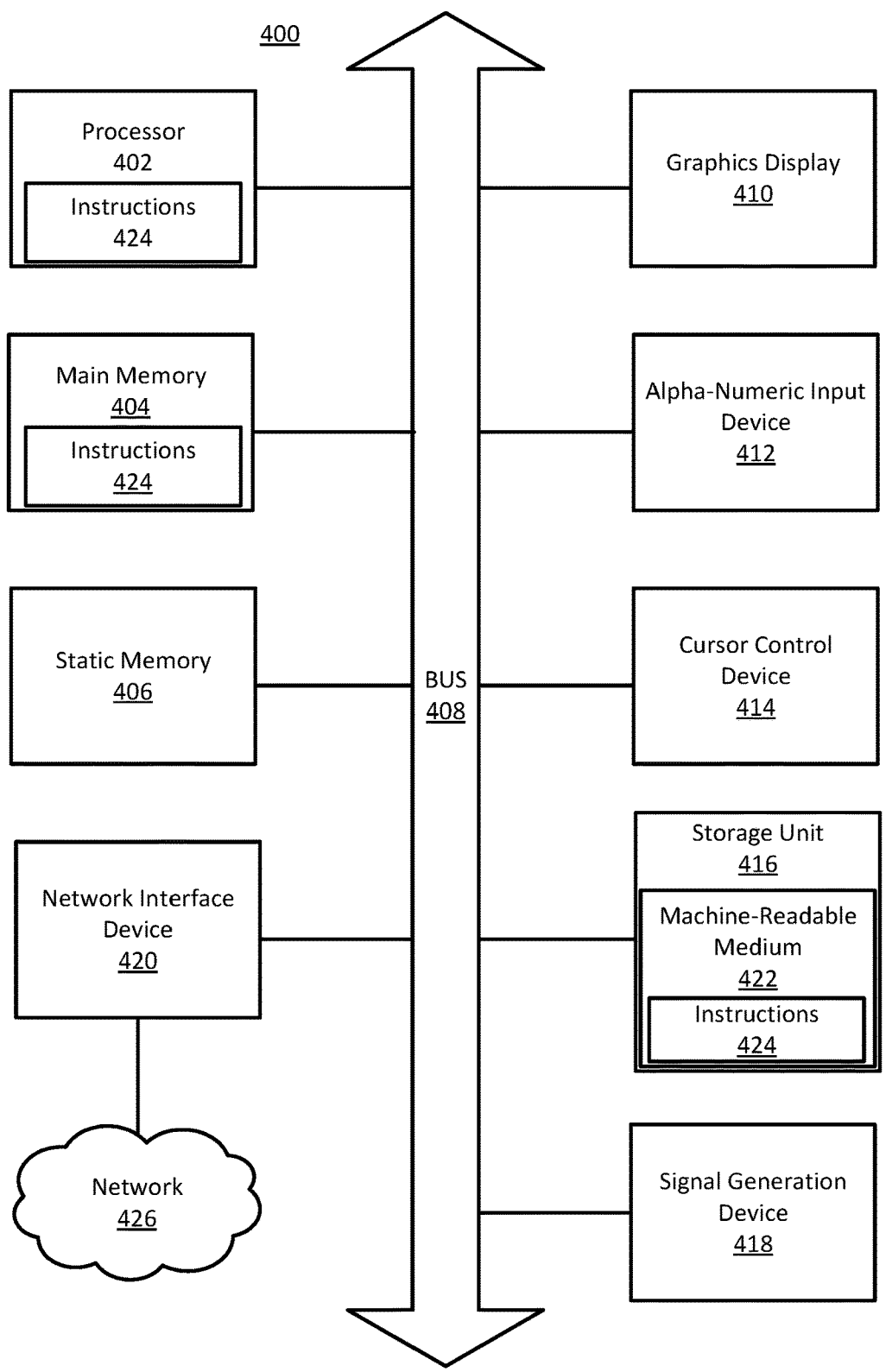
FIG. 4 is a diagram of components of an example machine for reading and executing instructions from a machine-readable medium, according to one example embodiment.

FIG. 4 is a block diagram illustrating components of an example machine for reading and executing instructions from a machine-readable medium. For example, the machine of FIG. 4 can be the client device 110, admin device 120, security server 140, or evaluation server 150. In some configurations, the machines may include more or fewer components than those shown in FIG. 4 (e.g., input devices, graphics displays, etc.). Generally, these configurations are embodiments in which the security server 140 or evaluation server 150 are a cloud network system or virtual machine.

As a more specific example, FIG. 4 shows a diagrammatic representation of a security server 140 in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404, and the storage unit 416 communicate via a bus 408.

In addition, the computer system 400 can include a static memory 406, a graphics display 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. For example, the instructions 424 may include the functionalities of modules of the system 100 described in FIG. 1. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable in different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor, and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for determining associations between detection rules and malware samples, the method comprising:
   receiving, at an evaluation server, a set of installation instructions including:
      a partition number representing the number of partitions to create on the evaluation server,
      a detection ruleset for evaluating a set of malware sample subsets, each malware sample subset containing at least one malware sample and the subsets, in aggregate, comprising a plurality of malware samples, and
   for each partition of the evaluation server:
      installing a protection application on the partition, the protection application to scan malware sample subsets by applying rules of the detection ruleset to the malware samples of each malware sample subset;
      receiving a malware sample subset of the set of malware sample subsets;
      scanning the malware samples in the malware sample subset by applying rules of the detection ruleset to the malware samples in the malware sample subset;
      determining an association between a malware sample of the malware sample subset and a rule of the detection ruleset, the association indicating which rules of the detection ruleset detect which malware samples in the malware sample subset;
   aggregating the associations from each partition of the evaluation server into an aggregate associations list;
   storing the aggregate association lists to a storage medium.

2. The method of claim 1, further comprising:
   receiving, at the evaluation server, the protection application for installation on each partition of the evaluation server from a client device, the client device requesting the evaluation of the detection ruleset against the plurality of malware samples.

3. The method of claim 1, further comprising:
   requesting, from a client device, an updated version of the protection application for installation on each partition of the evaluation server; and
   in response to the request, receiving the updated version of the protection application for installation on each partition of the evaluation server.

4. The method of claim 1, further comprising:
   for a partition of the evaluation server:
      in response to scanning the malware samples in the malware sample subset, receiving a new malware sample subset of the set of malware sample subsets; and
      scanning the malware samples in the new malware sample subset by applying rules of the detection ruleset to the malware samples in the new malware sample subset; and
      determining an new association between a malware sample of the new malware sample subset and a rule of the detection ruleset, the association indicating which rules of the detection ruleset detect which malware samples in the malware sample subset.

5. The method of claim 1, wherein the partition number indicates the number of partitions to install on the evaluation server such that each installed protection application takes approximately a same amount of time to evaluate one malware sample subset of the set of malware sample subsets.

6. The method of claim 1, wherein the partition number is a minimum number of partitions of on the evaluation server capable of evaluating, with installed protection applications, the set of malware sample subsets within an evaluation time period.

7. The method of claim 1, further comprising:
   receiving, at the evaluation server, the plurality of malware samples; and
   dividing the plurality of malware samples into a set of malware sample subsets according to an evaluation policy, the evaluation policy including at least one of an amount of time to evaluate a malware sample subset, a size of each malware sample subset, and a number of malware sample subsets.

8. The method of claim 1, further comprising:
   detecting a redundant rule in the aggregate association lists, the redundant rule only detecting a malware sample of the plurality of malware samples detected by at least one other rule; and
   removing the redundant rule from the detection ruleset.

9. The method of claim 1, further comprising:
   detecting an ineffective rule in the aggregate association lists, the ineffective rule failing to detect a malware sample of the plurality of malware samples; and
   removing the ineffective rule from the detection ruleset.

10. The method of claim 1, further comprising:
    detecting an unassociated malware sample, the unassociated malware sample not detected by any of the rules in the detection ruleset; and
    storing a flag in association with the unassociated malware sample in the storage medium.

11. A non-transitory computer-readable storage medium storing instructions for determining associations between detection rules and malware samples, the instructions when executed by one or more processors causing the one or more processors to perform steps including:
    receiving, at an evaluation server, a set of installation instructions including:
       a partition number representing the number of partitions to create on the evaluation server,
       a detection ruleset for evaluating a set of malware sample subsets, each malware sample subset containing at least one malware sample and the subsets, in aggregate, comprising a plurality of malware samples, and
    for each partition of the evaluation server:
       installing a protection application on the partition, the protection application to scan malware sample subsets by applying rules of the detection ruleset to the malware samples of each malware sample subset;
       receiving a malware sample subset of the set of malware sample subsets;
       scanning the malware samples in the malware sample subset by applying rules of the detection ruleset to the malware samples in the malware sample subset;
       determining an association between a malware sample of the malware sample subset and a rule of the detection ruleset, the association indicating which rules of the detection ruleset detect which malware samples in the malware sample subset;
    aggregating the associations from each partition of the evaluation server into an aggregate associations list;

storing the aggregate association lists to a storage medium.

12. The non-transitory computer-readable storage medium of claim 11, wherein the instructions, when executed by the one or more processors, further perform steps including:
receiving, at the evaluation server, the protection application for installation on each partition of the evaluation server from a client device, the client device requesting the evaluation of the detection ruleset against the plurality of malware samples.

13. The non-transitory computer-readable storage medium of claim 11, wherein the instructions, when executed by the one or more processors, further perform steps including:
requesting, from a client device, an updated version of the protection application for installation on each partition of the evaluation server; and
in response to the request, receiving the updated version of the protection application for installation on each partition of the evaluation server.

14. The non-transitory computer-readable storage medium of claim 11, wherein the instructions, when executed by the one or more processors, further perform steps including:
for a partition of the evaluation server:
in response to scanning the malware samples in the malware sample subset, receiving a new malware sample subset of the set of malware sample subsets; and
scanning the malware samples in the new malware sample subset by applying rules of the detection ruleset to the malware samples in the new malware sample subset; and
determining an new association between a malware sample of the new malware sample subset and a rule of the detection ruleset, the association indicating which rules of the detection ruleset detect which malware samples in the malware sample subset.

15. The non-transitory computer-readable storage medium of claim 11, wherein the partition number indicates the number of partitions to install on the evaluation server such that each installed protection application takes approximately a same amount of time to evaluate one malware sample subset of the set of malware sample subsets.

16. The non-transitory computer-readable storage medium of claim 11, wherein the partition number is a minimum number of partitions of on the evaluation server capable of evaluating, with installed protection applications, the set of malware sample subsets within an evaluation time period.

17. The non-transitory computer-readable storage medium of claim 11, wherein the instructions, when executed by the one or more processors, further perform steps including:
receiving, at the evaluation server, the plurality of malware samples; and
dividing the plurality of malware samples into a set of malware sample subsets according to an evaluation policy, the evaluation policy including at least one of an amount of time to evaluate a malware sample subset, a size of each malware sample subset, and a number of malware sample subsets.

18. The non-transitory computer-readable storage medium of claim 11, wherein the instructions, when executed by the one or more processors, further perform steps including:
detecting a redundant rule in the aggregate association lists, the redundant rule only detecting a malware sample of the plurality of malware samples detected by at least one other rule; and
removing the redundant rule from the detection ruleset.

19. The non-transitory computer-readable storage medium of claim 11, wherein the instructions, when executed by the one or more processors, further perform steps including:
detecting an ineffective rule in the aggregate association lists, the ineffective rule failing to detect a malware sample of the plurality of malware samples; and
removing the ineffective rule from the detection ruleset.

20. The non-transitory computer-readable storage medium of claim 11, wherein the instructions, when executed by the one or more processors, further perform steps including:
detecting an unassociated malware sample, the unassociated malware sample not detected by any of the rules in the detection ruleset; and
storing a flag in association with the unassociated malware sample in the storage medium, detecting a redundant rule in the results, the redundant rule only detecting a malware sample of the plurality of malware samples detected by at least one other rule; and
detecting an ineffective rule in the results, the ineffective rule failing to detect a malware sample of the plurality of malware samples; and
detecting an unassociated malware sample, the unassociated malware sample not detected by any of the rules in the malware detection ruleset; and
modifying the rules of the ruleset based on the detected redundant rule, ineffective rule, and unassociated malware sample.

* * * * *